United States Patent [19]

Vollert

[11] Patent Number: 4,599,627

[45] Date of Patent: Jul. 8, 1986

[54] APPARATUS AND METHOD FOR INK JET PRINTER

[75] Inventor: Emmeran Vollert, Grosshoehenrain, Fed. Rep. of Germany

[73] Assignee: Siemens Aktiengesellschaft, Berlin & Munich, Fed. Rep. of Germany

[21] Appl. No.: 646,202

[22] Filed: Aug. 31, 1984

[30] Foreign Application Priority Data

Sep. 8, 1983 [DE] Fed. Rep. of Germany ....... 3332491

[51] Int. Cl.[4] .............................................. G01D 15/16

[52] U.S. Cl. .................................. 346/140 R; 346/1.1

[58] Field of Search .................... 346/140 PD, 140 IJ, 346/1.1; 400/126; 101/416 R, 416 A; 118/313-315; 427/335, 398.3

[56] References Cited

U.S. PATENT DOCUMENTS 4,046,074 9/1977 Hochberg et al. .............. 400/126 X 4,196,437 4/1980 Hertz .................................. 346/1.1

4,340,893 7/1982 Ort ...................................... 346/1.1

FOREIGN PATENT DOCUMENTS 0034881 9/1981 European Pat. Off. .

54-6538 1/1979 Japan ........................... 346/140 PD 55-118869 9/1980 Japan ........................... 346/140 PD

*Primary Examiner*—E. A. Goldberg

*Assistant Examiner*—Mark Reinhart

*Attorney, Agent, or Firm*—Hill, Van Santen, Steadman & Simpson

[57] ABSTRACT

An ink jet printer employs writing fluid consisting of two components, one of which is located in a reservoir of a print head, with the other being situated in a separate reservoir of a further ejection apparatus. Discrete droplets are sprayed from individual jets of the print head onto the recording medium under the influence of individually controllable electro-mechanical transducers. The further ejection apparatus is mounted on the same carriage with the print head in an offset position, and incorporates spray apparatus for one or more discharge jets for ejecting the second fluid constituent onto regions of said recording medium corresponding to locations of the dots of printed characters. The use of two fluid components achieves reduced drying time of the writing fluid, and eliminates clogging of the print head.

11 Claims, 5 Drawing Figures

APPARATUS AND METHOD FOR INK JET PRINTER

FIELD OF THE INVENTION

The present invention relates to ink jet printers and more particularly to such printers utilizing a two-component writing fluid with individual droplets forming a character being ejected from separate jets.

THE PRIOR ART

In connection with ink jet printer apparatus, a number of factors are important. For example, it is very desirable to achieve a smear-proof print image immediately after printing. Also the printed character should be high in contrast. The smear proof and high contrast qualities should be largely independent of the material of the recording medium. However, the requirements for the writing fluid which is used are somewhat contradictory with the above requirements. Thus, while it is known that substances may be added to the writing fluid in order to reduce the drying time, this produces a tendency for the writing fluid to dry in the extremely fine and thin discharge openings of the print head, so that these become blocked. The same is true for additives intended to increased contrast. When a few of the discharge openings become blocked, there is a noticable deterioration of the print image, and when all of the discharge openings become blocked, the printer is not functional.

In copending German application DE-S No. 3,128,231, a special ink is described which has a shorter drying time. The ink includes cyclo hexanol as a component. The manufacture of such ink is complicated, however, because the metering of the individual constituents must take place with great precision. Therefore, this ink has been found restricted to special uses such as writing on specially prepared paper or films.

In another arrangement, described in U.S. Pat. No. 4,340,893, a gas or air stream is directed against the printing location after application of the writing fluid, in order to reduce the drying time. However, the structure involved is relatively complicated.

In another proposal, the liquid components of the writing fluid are not combined until they are placed on the recording medium. This has been found appropriate to improve the adhesion of ink to smooth surfaces such as, for example, glass or metal. A cover layer is first applied to the entire surface of the recording medium, and then ink droplets are applied to the cover layer. This is described in European patent application EPA No. 10,034,881. This enhances the writing on smooth surfaces since it is the cover layer which is printed on instead of the smooth surface itself. This technique does not promote fast drying, however, nor resistance to smearing immediately after printing. Furthermore, all of the surface must be coated, instead of only the surface area which are to be printed.

Still another known arrangement incorporates a non-pigmented liquid component which is moved through a layer consisting of a second pigmented liquid component, the first component being ejected in the form of a thin jet. This is described in U.S. Pat. No. 4,196,437.

The droplets which emerge after penetration of the layer than form the actual writing fluid. The nonpigmented fluid component can be an agent that promotes drying. This technique has proved to be relatively expensive and there is also a problem resulting from the fact that droplets of different sizes are ejected at different speeds.

BRIEF DESCRIPTION OF THE PRESENT INVENTION

A principal object of the present invention is to provide an apparatus and method for an ink jet printer which promotes a smear free image and rapid drying of the ink. Another object of the present invention is to employ a structurally simple apparatus which gives the assurance of a constant flight speed and a constant size of the character form in droplets.

These and other objects and advantages of the present invention will become manifest on an inspection of the following description and the accompanying drawings.

In one embodiment of the present invention, a fluid component which speeds the drawing of the writing fluid is separately ejected from the print head, independently of the ink droplets, so that the ink jets of the print head are not blocked due to evaporation of the solvent, and it is possible to employ fluid constituents that do not require any special recording medium. At the same time the two fluid components can be optimally matched within wide limits for characteristics such as pigment content, viscosity, evaporation, surface tension, etc. Due to the separation in space of individual constituents of the writing fluid, the evaporation of the solvent does not effect a drying of the pigment containing constituent. Further, neither the flight speed nor the size of the droplets that form the character are altered. The second ejection means is advantageously equipped with a spray means, so that the second fluid component is respectively distributed over the region of a character in grid-like fashion.

BRIEF DESCRIPTION OF THE DRAWINGS

Reference will now be made to the accompanying drawings in which.

DESCRIPTION OF THE PREFERRED EMBODIMENTS

Figure 1:
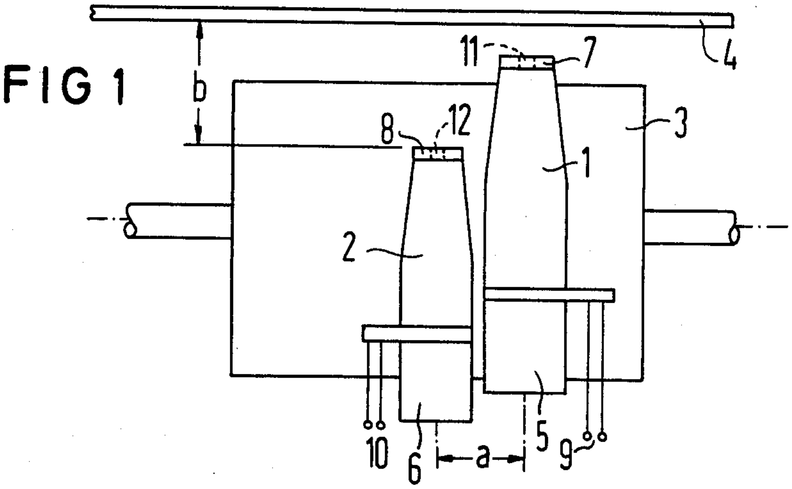
FIG. 1 is a plan view of apparatus constructed in accordance with the present invention in which the ejection apparatus for the second fluid component comprises only a single discharge opening.
Figure 2:
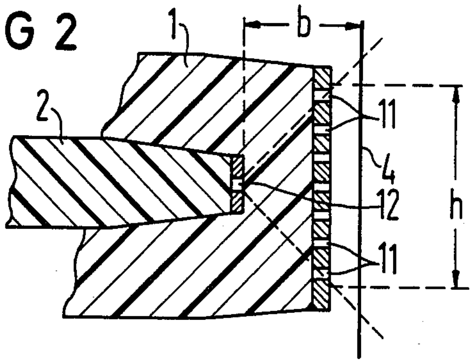
FIG. 2 is a side view of the apparatus of FIG. 1, shown in cross-section.

Referring now to the drawings, FIGS. 1 and 2 illustrate apparatus in which the characters printed on the recording medium by an ink jet printer are sprayed with the second fluid component, for example, a drying solvent. The print head 1 comprises a conventional print head for an ink jet printer, and the ejection apparatus comprises a second ejection head 2 disposed adjacent to the print head 1. Both the print head 1 and the ejection head 2 are mounted on a carriage 3, the latter being moved in front of the recording medium 4 in a straight line by means of a drive apparatus (not shown). The print head 1 and the ejection head 2 each have an individual fluid reservoir 5 and 6, and each have a jet plate 7 and 8, respectively, and electrical connections 9 and 10, respectively. The jet plates 7 and 8 comprise, for example, a front shoe with one or more apertures defined therein.

The jet plate 7 of the print head 1 incorporates seven jet openings 11 (FIG. 2), from which individual droplets of ink are ejected under the influence of electromechanical transducers (not shown). As known to those skilled in the art, the openings in the jet plate are in communication with an ink channel leading to an ink reservoir within the print head, such ink channel being influenced by a piezo-electric crystal. When the piezoelectric crystal is designed as a small tube, then a shock or pressure wave brings about ejection of a droplet when the tube is electrically energized, due to a change in the inside diameter of the tube. Grid-like or matrix-like characters can then be represented by a means of relative motion between the print head and the recording medium.

The ejection head 2 has a single jet opening 12, the diameter of which is the same as or greater than the diameter of the openings 11 of the print head 1. The ejection head 2 is equipped with the means for atomizing fluid. That is achieved, for example, by discharging the fluid with a higher ejection frequency than that used with the ink fluid in the print head 1. When the fluid component is a drying solvent, the solvent is sprayed on to the recording medium 4 from the jet opening 12 of the ejection head 2 in a finely distributed form. The ejection head 2 is advantageously displaceable on the carriage 3 such that the length of its spacing from the recording medium is variable in accordance with the size of the area to be sprayed. This is essentially defined by the height h of a character being printed. The fluid component of the ejection head 2 completely covers the points of the grid formed by the droplets discharged by the print head 1. A rapid reaction occurs between the fluid component ejected from the ejection head 2, together with the fluid component discharged by the printer head 1, and this reaction occurs on the recording medium.

Figure 3:
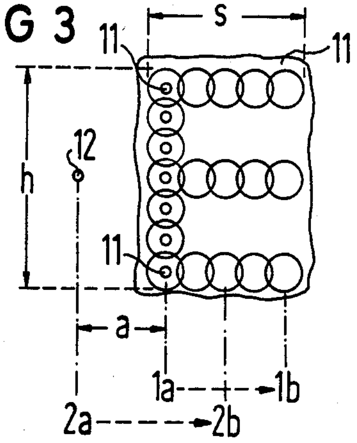
FIG. 3 is a diagramatic view illustrating the manner of operation of the apparatus of FIGS. 1 and 2.

The ejection head 2 is preferably mounted on the carriage 3 at such a distance from the print head 1 that its fluid discharge always occurs when a complete character has been written. This distance is defined by the size of the character grid selected for the representation of a character. In the example of FIG. 3, a 5×7 grid is employed for the grid-like representation of a character. The print head 1 shown in FIGS. 1 and 2 forms the character "E" shown in FIG. 3 by printing a plurality of dots in each of successive columns until the character is completely formed. For example, when the print head 1 is located at position 1*a* (FIG. 3), then all of the jets are excited, and seven dots are printed. Droplets are sprayed in the left hand column of the character simultaneously. The print head then moves rightwardly to the next column and the highest, middle and lowest jets are excited. This begins the creation of the horizontal lines of the character "E". This continues until the fifth column has been reached at which the representation of "E" is complete. The drive of the jets is suppressed during the next two columns, in order to obtain spacing between successive characters. Thus, the overall print cycle of the character comprises seven column steps.

In the example of FIG. 3, the emission of the fluid component from the ejection head 2 preferably occurs when the ejection head 2 is centrally located relatively to the character being printed. When the first five columns have been printed by the print head 1, the print head is moved from position 1*a* to the position 1*b*. During this same interval the ejection head 2 is moved from position 2*a* to the position 2*b*, and is now situated in the center of the character "E". In this position, the ejection is initiated, by means of a control pulse derived from the column clock pulse source for example, and the region within which the character "E" is printed is sprayed with the fluid component discharge by the ejection head 2. As a result, the character is rendered smear proof immediately after being printed.

Figure 4:
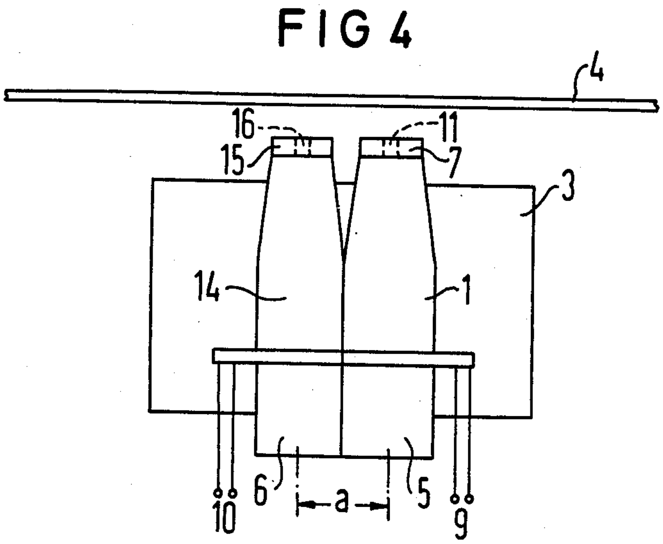
FIG. 4 is a plan view of apparatus constructed in accordance with the present invention having a plurality of discharge openings and FIG. 5 is a front view of the apparatus of FIG. 4.
Figure 5:
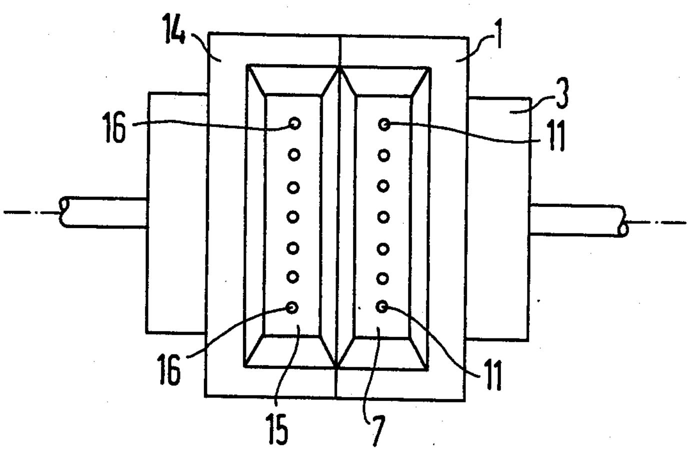

In another embodiment of the invention, the ejection apparatus can comprise a plurality of discharge openings which correspond in number and arrangement to the discharge openings in the print head. FIGS. 4 and 5 show an exemplary embodiment of this arrangement. The print head 1 and the ejection head 14 are again mounted on a common carriage 3 which is moved relative to the recording medium. Each has a fluid reservoir 5 and 6, for storing the fluid components of the writing fluid. The ejection head 14 differs from the ejection head 2 of FIGS. 1 and 2 in that seven discharge openings 16 are provided. The ejection head 14 is spatially offset from the print head 1 by the distance a, but both are located at the same distance from the recording medium 4. The drive pulses for the jets of the ejection head 14 duplicates the same pattern as the control pulses which are supplied to the print head 1 for representing the characters. These pulses arrive, however, later in time, after the ejection head 14 has been moved into alignment with the dots which have been sprayed under the recording medium by the print head 1. The spacing between the print head 1 and the ejection head 14, as well as the time delay between application of driving pulses to both heads, are defined by the operating mode of the printer. Preferably, when a character representation is based on a 5×7 grid, with a single piece jet arrangement, the spacing is preferably about 3 column widths, with the drive for the ejection 14 being initiated at a time corresponding to three column widths after the energization of the print head 1. In this manner, the points which make up the dots of the character "E" are each covered on a point-by-point basis with the fluid component ejected by the ejection head 14, almost immediately after application of the fluid by the print head 1. In this way, the amount of fluid is conserved, in comparison with the arrangement shown in FIGS. 1 and 2, and also there is an improvement in the reaction between the two fluid components which achieves faster drying.

In another arrangement, the ejection apparatus is disposed above or below the print head, respectively, that is, spaced therefrom in a direction transverse to the direction of movement between the carriage 3 and the recording medium 4. The ejection apparatus is controlled by pulses derived from the line memory of the printing apparatus to correspond to the pulses which drive the print head 1 during printing of the corresponding line. This arrangement is particularly advantageous in connection with bi-directional printing devices, when the second fluid component must always be applied after (or always applied before) the writing fluid. In case the second component must be applied before the writing fluid, the ejection head is mounted below the print head, to prepare each line of the recording medium 4 before the line is printed by the print head. In similar fashion, when the second fluid component is to be applied after printing of the ink dots, the ejection head is located above the print head 1.

It is apparent that various other modifications and additions may be made in the apparatus and methods of the present invention without departing from the essential features of novelty thereof, which are intended to be defined and secured by the apended claims.

What is claimed is:

1. Apparatus for an ink jet printer using a two-component writing fluid for quick drying in which individual droplets forming a character are ejected from individual jets of a print head under the influence of drive pulses, and means for moving said print head relative to a recording medium, including, in combination;

further ejection apparatus mounted in spaced relationship to said print head and movable therewith, separate reservoirs provided for ink for said print head and drying liquid for said ejection apparatus for separately storing said ink and said drying liquid as first and second individual liquid components of said writing fluid, one of said reservoirs containing ink and the other reservoir containing drying liquid, and means for discharging said second liquid component from said ejection apparatus at a time which is offset relative to the ejection of the first liquid component contained in the reservoir of the print head, said second liquid component being ejected from said ejection apparatus to cover only the region of said recording medium which receives the representation of a character from said print head.

2. Apparatus according to claim 1, wherein said ejection apparatus comprises at least one discharge opening and including means for discharging said second liquid fluid component in an atomizing or spraying fashion.

3. Apparatus according to claim 1 or claim 2 wherein said ejection apparatus comprises only one discharge opening, said ejection apparatus being adjustably mounted relative to said print head for adjusting the spacing between the discharge opening of said ejection apparatus and the recording medium, so that the sprayed surface on said recording medium corresponds to the height of a character printed by said print head.

4. Apparatus according to either claim 1 or claim 2 wherein said ejection apparatus is spaced from said print head in a direction parallel to the direction of movement of said print head, said spacing corresponding to an integral number of column spacings of the columns of the representation of a character.

5. Apparatus according to claim 4 wherein said spacing between said ejection apparatus and said print head is such that said ejection apparatus is positioned approximately in the center of the printed character after conclusion of printing each character by said print head.

6. Apparatus according to claim 4 including means for supplying column clock pulses as drive pulses to said print head and wherein said ejection apparatus is energized by a pulse in synchronism with said drive pulses.

7. Apparatus according to claim 1 wherein said print head has a plurality of first discharge openings each associated with one of said jets, said ejection apparatus comprises a plurality of second discharge openings corresponding in number and arrangement with the said first discharge openings of said print head, said second discharge openings being spaced from said recording medium the same distance as the said first discharge openings of said print head, and means for energizing said ejection apparatus to discharge said second liquid component therefrom with the same droplet ejection speed as said print head, the drive pulses for said droplet discharge of said second liquid component from said ejection apparatus being identical to the drive pulses for the individual droplets of said first liquid component from said print head but offset in time therefrom by at least one column step.

8. Apparatus according to claim 1 wherein said ejection apparatus is disposed in spaced relation to said print head, in a direction transverse to the relative movement between said print head and said recording medium, and means for driving said ejection apparatus with pulses derived from a line memory.

9. In an ink jet printer, a method of improving the quality of printing dots of writing fluid on a recording medium, by speeding the drying of said writing fluid comprising the steps of;

dividing the full constituents of the dot-forming fluid into first and second liquid components, said first liquid component including a pigment, forming a plurality of characters with dots in a grid-like pattern with droplets of said pigment containing liquid, and depositing drying liquid as said second liquid component on said recording medium at locations corresponding to the positions of said characters at a time which is offset from the time of formation of said pattern.

10. The method according to claim 9, including the step of spraying said second liquid constituent over an area corresponding to the dots of an entire character.

11. The method according to claim 9, including the step of depositing said second liquid constituent in dot-like form only at the locations of said recording medium which correspond to positions of said dots.

* * * * *